United States Patent [19]

Meyerhoefer

[11] Patent Number: 4,882,748
[45] Date of Patent: Nov. 21, 1989

[54] HOMOLOGATED PROTECTOR MODULES FOR TELEPHONE CONNECTOR BLOCKS

[75] Inventor: Carl Meyerhoefer, Dix Hills, N.Y.
[73] Assignee: Porta Systems Corp., Syosset, Del.
[21] Appl. No.: 251,231
[22] Filed: Sep. 30, 1988
[51] Int. Cl.⁴ ............................................. H02H 9/06
[52] U.S. Cl. .................................... 379/332; 379/412; 337/32; 361/119
[58] Field of Search ............... 379/328, 331, 332, 412; 361/119, 120; 337/28, 29, 30, 31, 32, 33, 34

[56] References Cited

U.S. PATENT DOCUMENTS

| | | | |
|---|---|---|---|
| 4,149,211 | 4/1979 | De Hoff | 361/119 |
| 4,512,622 | 4/1985 | Carney et al. | 339/103 |
| 4,573,100 | 2/1986 | Fasano | 337/34 X |
| 4,730,229 | 3/1988 | De Luig et al. | 361/119 |

Primary Examiner—James L. Dwyer
Attorney, Agent, or Firm—Charles E. Temko

[57] ABSTRACT

A series of individual telephone subscriber circuit modules for use with telephone connector blocks having flat insulation displacement clips projecting from a planar surface thereof. The block mounts a grounding strip medially positioned on said surface. The modules employ known protection components, and in various modifications, are suitable for providing alternatively three point protection or five point protection utilizing either or both of gas tube and fuse components. Depending upon specific requirements, each module protects either two or four subscriber circuits.

6 Claims, 3 Drawing Sheets

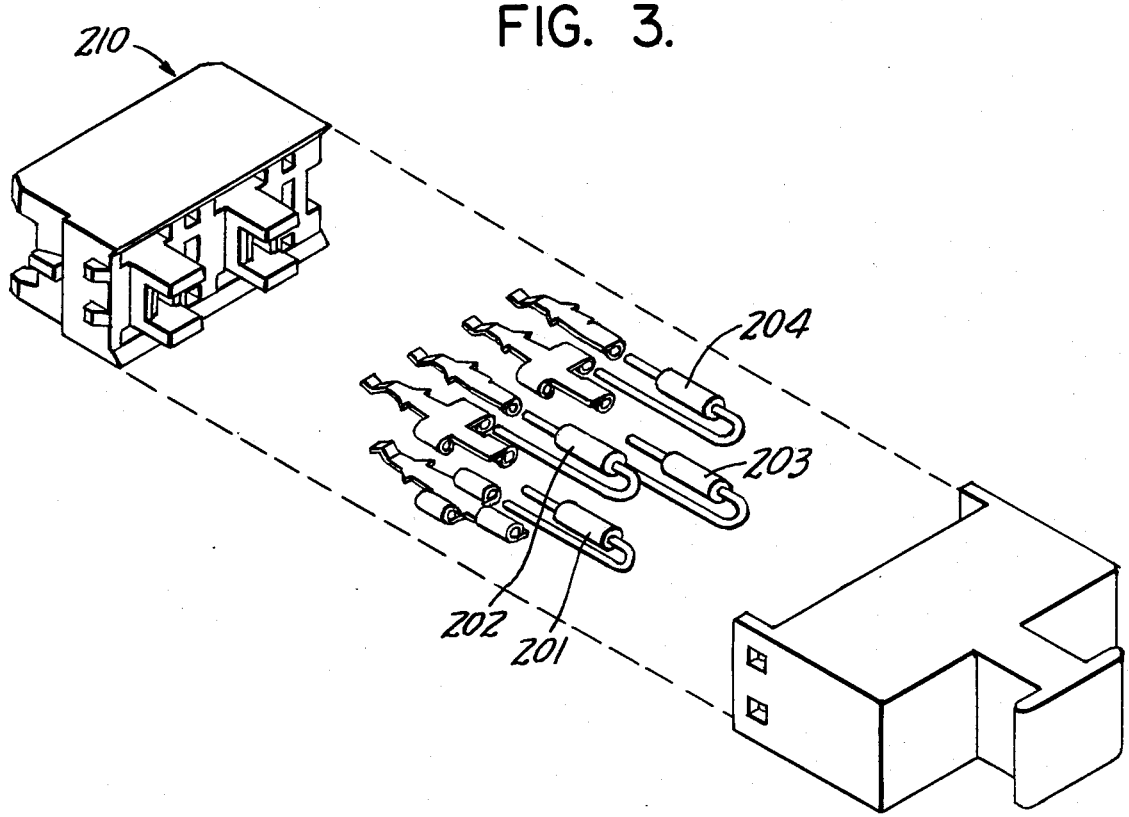
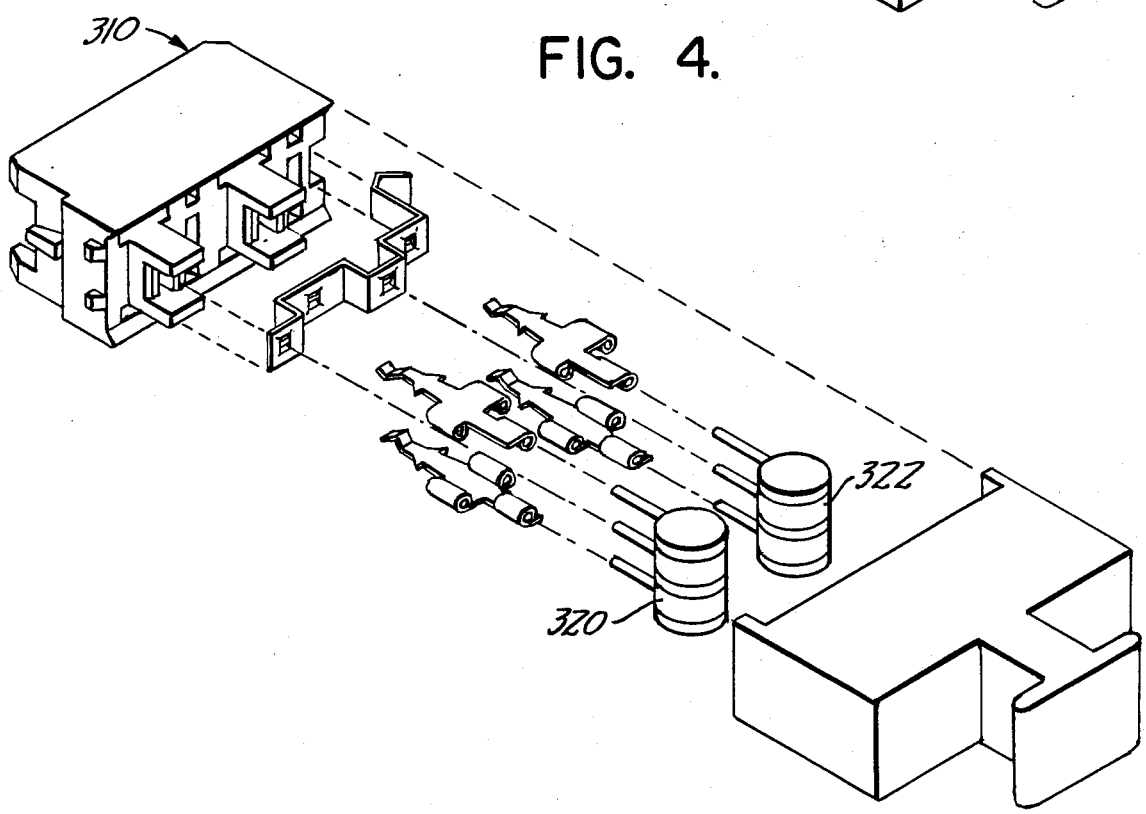

HOMOLOGATED PROTECTOR MODULES FOR TELEPHONE CONNECTOR BLOCKS

RELATED APPLICATION

Reference is made to copending application Ser. No. 07/227,079 Filed Aug. 1, 1988, assigned to the same assignee as the present application, which discloses and claims a related invention.

BACKGROUND OF THE INVENTION

This invention relates generally to the field of telephony, and more particularly to improved individual subscriber circuit protector modules of a type adapted to engage connector blocks which interconnect such subscriber circuits to in plant equipment. Devices of this general type are known in the art, and the invention lies in specific constructional details which permit low overall cost of manufacture, ease of assembly, and the provision of a family of modules, the individual members of which are adapted to meet the requirements of individual telephone systems.

At the present state of the art, the original carbon arc electrodes which provide an air gap to a point of ground potential have been substantially replaced by gas tubes which provide excess voltage surge protection in a more reliable manner. Current overload protection has been traditionally provided by heat coils which melt a fusable element thereby actuating a resiliently urged grounding component.

For many protector module installations, available space limitations have precluded the use of heat coils which are substituted by wire fuses or solid state protection. Many new connector block installations use blocks having front administered insulation displacing clips, commonly referred to as quick clips, such blocks being devoid of means for mounting conventional protector modules. It is known in the art to provide protector modules of miniaturized dimensions which directly engage such protector blocks. Typical of such blocks is that disclosed in U.S. Pat. No. 4,512,622 granted Apr. 23, 1985 to William V. Carney, et al., and assigned to the same assignee as the present application. The device disclosed in this application is equipped with conventional pin type modules which require additional space, and are not readily accessible from the front of the block.

SUMMARY OF THE INVENTION

Briefly stated, the invention contemplates the provision of a family of protector modules of the class described which are adapted to directly engage the exposed ends of insulation displacing terminals comprising parts of individual subscriber circuits on a connector block. The members of the family employ a common base element and housing, and means for communicating with a grounding conductor positioned laterally of the longitudinal axis of the module. Each of the members of the series utilizes a common grounding terminal and a plurality of contact elements having a contact tab on one end thereof and one or more socket-like recesses at an opposite end thereof for engaging a protector means, either in the form of a wire fuse or a gas tube, either singly or in combination. Since each of the series employs a large number of common elements, these elements can be formed using common tooling. Depending upon the manner of interconnection, each module is capable of providing either two or four subscriber circuits carried by the connector block.

BRIEF DESCRIPTION OF THE DRAWINGS

In the drawings, to which reference will be made in the specification, similar reference characters have been employed to designate corresponding parts throughout the several views.

FIG. 3 is an exploded view in perspective of a third embodiment thereof.

FIG. 4 is an exploded view in perspective of a fourth embodiment thereof.

DETAILED DESCRIPTION OF THE DISCLOSED EMBODIMENTS

Figure 1:
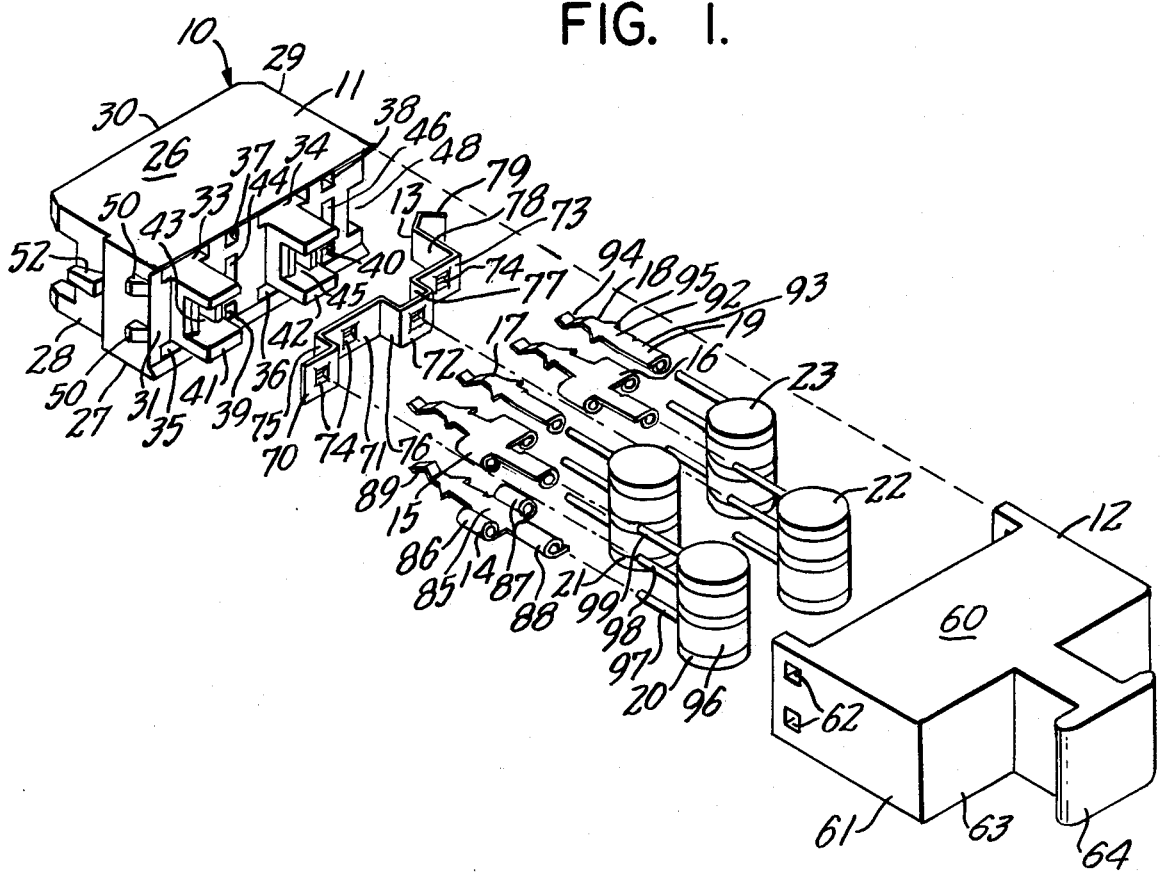
FIG. 1 is an exploded view in perspective of a first embodiment of the invention.
Figure 2:
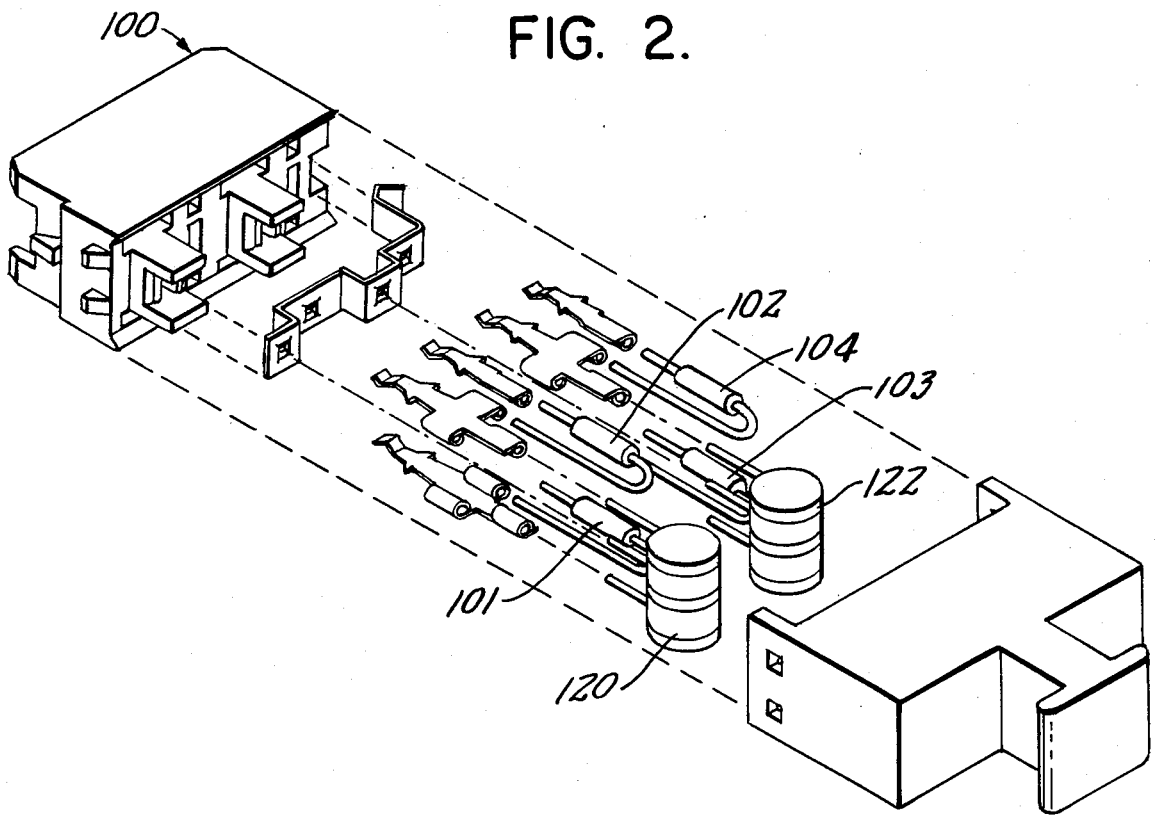
FIG. 2 is an exploded view in perspective of a second embodiment thereof.

In accordance with the invention, the first embodiment thereof, generally indicated by reference character 10 (FIG. 1) comprises broadly: a base element 11 and a cover element 12 forming a housing. Disposed within the housing is a grounding element 13, a plurality of first terminal elements 14, 15, and 16; and a plurality of second terminal elements 17 and 18. Communicating with the elements 13–18 are a plurality of three element gas tubes 20, 21, 22 and 23.

The base element 11 is preferably formed as a synthetic resinous insulative molding, and is bounded by an upper surface 26, a lower surface 27, first and second end surfaces 28 and 29, a forward surface 30 and a rear surface 31. It is penetrated by first, second, third, and fourth relatively wide openings 33, 34 35 and 36, respectively. A corresponding number of relatively narrow openings 37, 38, 39, and 40 are positioned in coplanar relation. Extending rearwardly of the rear surface 31 are a pair of positioning extensions 41 and 42 which support the grounding element 13. Underlying the grounding element 13 are first, second, third and fourth medially positioned openings 43, 44, 45 and 46, respectively. A free end of the grounding element 13 is engaged within a corresponding recess 48. Positioned on each of the end surfaces 28–29 are projections 50. A projection 52 engages a corresponding recess (not shown) on the protector block to assure proper orientation during engagement.

The cover element 12 is also formed as a synthetic resinous molding and is of hollow configuration. It is bounded by a pair of side walls 60, and a pair of end walls 61 having openings 62 corresponding to the projections 50. An outer wall 63 mounts a handle member 64, the walls 60, 61 and 64 defining a hollow cavity or enclosure in which the protective means is disposed.

The grounding element 13 is preferably formed as a stamping from phosphor bronze or similar planar material. It includes first, second, third, and fourth planar portions 70, 71, 72 and 73, each having a resilient opening 74 formed by pressed out tabs. These are interconnected by first, second, third and fourth offset portions 75, 76, 77 and 78. A laterally extending resilient terminal 79 projects outwardly from the recess 48 to resiliently contact a ground strip 80 (FIG. 5) when the module is engaged upon a block.

The first terminal elements 14–16, are substantially similar and are formed as sheet metal stampings. Each includes a main body portion 85, a pair of laterally extending socket portions 86 and 87, as well as a medially positioned socket portion 88. Extending forwardly from the main body portion 85 is an axially aligned contact 89 which passes through the base element 11 to contact an individual insulation displacement terminal.

The second terminal elements 17 and 18 are somewhat similar, and may be formed from the same tooling. The main body portion 92 thereof is considerably narrower, and only a single socket portion 93 is present at the outer end thereof. The resilient contact portion 94 is similar to the portion 89. These portions are maintained within the base element 18 by barbs 95.

The gas tubes 20–23 are of known construction, each including a cylindrical body 96, and first, second and third electrodes 97, 98 and 99.

Figure 5:
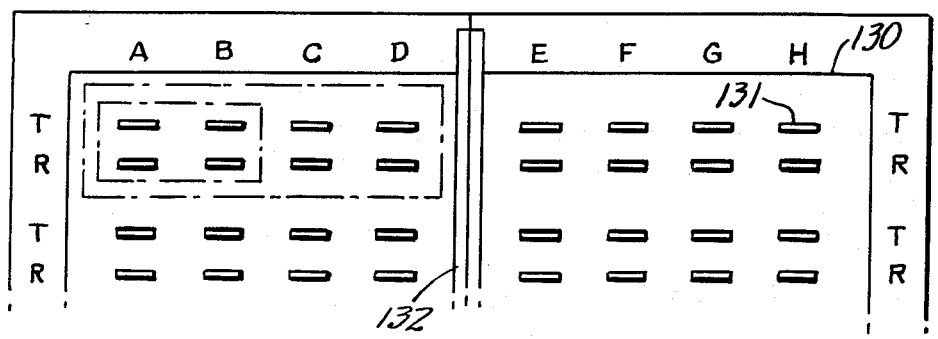
FIG. 5 is a fragmentary view in elevation of a telephone connector block mounting the disclosed embodiments.
Figure 6:
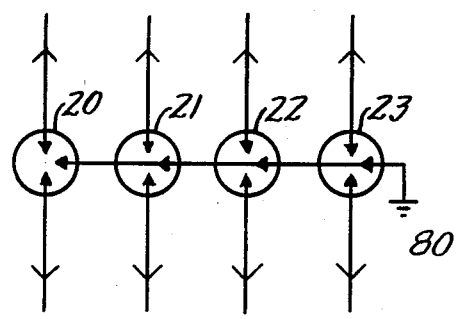
FIG. 6 is a schematic wiring diagram of the first embodiment.

Referring to FIGS. 5 and 6, when the module is interconnected to a block 130 having individual insulation displacement clips 131, the terminal 79 will resiliently contact a ground strip 132. In the first embodiment, the interconnection of the gas tubes is such that three point protection is provided for four subscriber pairs.

Figure 7:
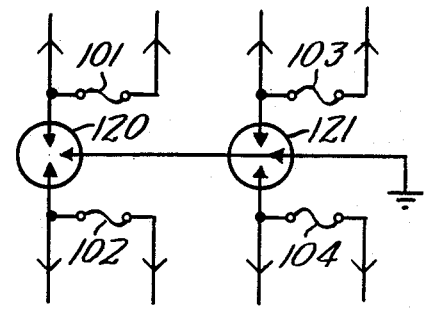
FIG. 7 is a schematic wiring diagram of the second embodiment.
Figure 8:
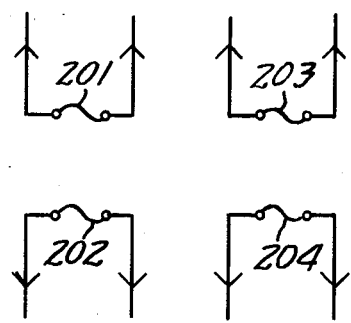
FIG. 8 is a schematic wiring diagram of the third embodiment.
Figure 9:
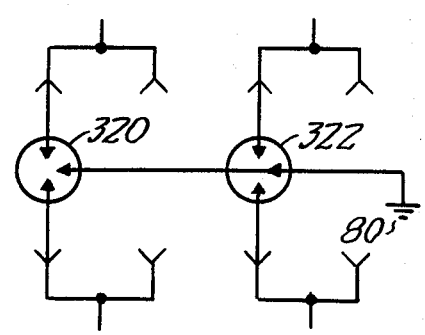
FIG. 9 is a schematic wiring diagram of the fourth embodiment.

Referring now to the second embodiment of the invention, generally indicated by reference character 100, to avoid needless repetition, parts corresponding to those of the first embodiment have been designated by similar reference characters with the prefix "1". As best seen from a consideration of FIG. 7, only two gas tubes are provided which are connected in series with four fuse elements 101, 102, 103 and 104 to provide both excess current and excess voltage protection. In this case, a single module will provide five point protection to two subscriber circuits.

Referring to the third embodiment, generally indicated by reference character 210, again, to avoid needless repetition, parts corresponding to those of the first embodiment have been designated by similar reference characters with the additional prefix "2".

The third embodiment is suitable for use where only excess current protection is required. The gas tubes and grounding element 13 are, therefore, eliminated, and protection consists solely of four fuses 201-204.

In the fourth embodiment, generally indicated by reference character 310, corresponding parts have been designated by similar reference characters with the additional prefix "3". In this embodiment, using gas tube protection only, three point protection is provided to two subscriber pairs.

It may thus be seen that I have invented novel and highly useful improvements in protector module construction, in which a family of modules has been provided which may be manufactured using common tooling with resulting savings in the cost of manufacture. As contrasted with the common pin-type protector module, the thickness of the module is substantially reduced, allowing the same to be used in conjunction with the now popular insulation displacement terminal type block which allows front administration, not only during the installation of the subscriber circuits, and the provision of protector module means as well.

I wish it to be understood that I do not consider the invention to be limited to the precise details of structure shown and set forth in this specification, for obvious modifications will occur to those skilled in the art to which the invention pertains.

I claim:

1. An improved telephone subscriber circuit protector module for use in conjunction with a connector block having exposed insulation displacement terminals on a planar surface thereof, said module being selectively engageable with plural numbers of said insulation displacement terminals and having a principal longitudinal axis, said module comprising: a base element, a hollow cover element engaged upon said base element to define an enclosed cavity; a plurality of elongated axially oriented contacts positioned within said cavity, each having a first end penetrating said base element to contact one of said insulation displacement terminals on said block, and second ends having socket forming means thereon; and a plurality of protective elements having means thereon engaging said socket forming means.

2. A protector module in accordance with claim 1, further characterized in said protective elements including fuses.

3. A protector module in accordance with claim 1, further comprising a perforate grounding element supported transversely with respect to said principal axis upon said base element, and having a free end forming a terminal extending outwardly of said base element, said protective elements having means interconnecting said contacts and said grounding element.

4. A protector module in accordance with claim 3, further characterized in said protector elements comprising gas tubes.

5. A protector module in accordance with claim 3, further characterized in said protective elements comprising a combination of gas tubes and fuses.

6. In a combination telephone subscriber circuit connector block and a protector module therefor, the improvement comprising: said connector block having an exposed planar surface, a plurality of insulation displacing wire terminals thereon projecting from said surface, a grounding strip carried by said surface and extending medially thereon; said module comprising a base element, a hollow cover element engaged upon said base element to define an elongated cavity, a perforate grounding element supported transversely with respect to said base element and having a free end forming a terminal extending outwardly of said base element; a plurality of elongated axially oriented contacts positioned within said cavity, and having first ends penetrating said base element to contact said insulation displacement terminals on said block, and second ends having socket forming means thereon; and a plurality of protective elements having means thereon engaging said socket forming means; said free end of said grounding element extending outwardly of said base element and resiliently contacting said grounding strip.

* * * * *